US012400198B2

(12) United States Patent
Thimmareddy et al.

(10) Patent No.: US 12,400,198 B2
(45) Date of Patent: *Aug. 26, 2025

(54) BANKING AT AN ATM USING A MOBILE DEVICE

(71) Applicant: Bank of America Corporation, Charlotte, NC (US)

(72) Inventors: Arjun Thimmareddy, Charlotte, NC (US); Bryan T. King, Charlotte, NC (US); Alexander S. Lee, Jacksonville, FL (US); Vaishnavi Varma, New York, NY (US); Tony Aidoo, Aubrey, TX (US); Paula M. Booze, Charlotte, NC (US); Ramesh B. Chandanala, Charlotte, NC (US); William R. Conrad, New Castle, DE (US); Juliet Abdul-Aziz, Chester (GB); Gerard P. Gay, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/945,283

(22) Filed: Sep. 15, 2022

(65) Prior Publication Data
US 2024/0095698 A1  Mar. 21, 2024

(51) Int. Cl.
*G06Q 20/10* (2012.01)
*G06Q 20/32* (2012.01)
(Continued)

(52) U.S. Cl.
CPC ..... *G06Q 20/1085* (2013.01); *G06Q 20/3221* (2013.01); *G06Q 20/3223* (2013.01);
(Continued)

(58) Field of Classification Search
CPC ............. G06Q 20/1085; G06Q 20/386; G06Q 20/3221; G06Q 20/3223; G06Q 20/3224; G06Q 20/3278; G06Q 20/4014
(Continued)

(56) References Cited

U.S. PATENT DOCUMENTS

| 7,686,213 B1 * | 3/2010 | Ramachandran ...... G06Q 20/32 |
| | | 235/379 |
| 8,083,141 B1 * | 12/2011 | Courtright ........... G06Q 20/204 |
| | | 235/383 |

(Continued)

FOREIGN PATENT DOCUMENTS

| CN | 111476654 A * | 7/2020 | ........... G06F 21/335 |
| DE | 102014204231 A1 * | 9/2014 | ......... G06Q 20/1085 |

(Continued)

OTHER PUBLICATIONS

Takawale MB, Mane MA. A Survey On Cardless Automated Teller Machine (ATM). A Survey On Cardless Automated Teller Machine (ATM). 2019. (Year: 2019).*

(Continued)

*Primary Examiner* — Sara C Hamilton
(74) *Attorney, Agent, or Firm* — Weiss & Arons LLP

(57) ABSTRACT

Methods for banking at an automated teller machine (ATM) using a mobile device. The ATM may automatically detect the presence of the mobile device in a vicinity of the ATM and initiate contact with the mobile device, or a mobile device may initiate contact with the ATM. After verifying user permission to access the ATM, the mobile device may be enabled to provide user access to one or more of the banking services available at the ATM using the mobile device and to view banking-related information on the mobile device. A mobile application on the mobile device may be used to access the ATM using the mobile device. While a mobile device is accessing the ATM, a screen on the (Continued)

ATM may become inactive for banking services and the option to select banking services directly at the ATM may be disabled.

15 Claims, 9 Drawing Sheets

(51) Int. Cl.
  *G06Q 20/38* (2012.01)
  *G06Q 20/40* (2012.01)
(52) U.S. Cl.
  CPC ..... *G06Q 20/3224* (2013.01); *G06Q 20/3278* (2013.01); *G06Q 20/386* (2020.05); *G06Q 20/4014* (2013.01)
(58) Field of Classification Search
  USPC .......................................................... 705/43
  See application file for complete search history.

(56) References Cited

U.S. PATENT DOCUMENTS

| | | | | |
|---|---|---|---|---|
| 8,321,346 | B2* | 11/2012 | Celi, Jr. | G07F 19/20 |
| | | | | 705/40 |
| 8,459,546 | B1* | 6/2013 | Block | G07G 3/003 |
| | | | | 235/379 |
| 8,955,743 | B1* | 2/2015 | Block | G07F 19/207 |
| | | | | 235/379 |
| 10,445,711 | B1* | 10/2019 | Arumugam | G06Q 20/3274 |
| 10,510,065 | B2 | 12/2019 | Benkreira et al. | |
| 10,535,047 | B1* | 1/2020 | Thomas | G06Q 20/326 |
| 10,706,400 | B1* | 7/2020 | Puffer | G06Q 20/38215 |
| 11,023,871 | B1 | 6/2021 | Phillips et al. | |
| 11,257,067 | B1* | 2/2022 | Yang | G07F 19/20 |
| 11,308,481 | B1* | 4/2022 | Thomas | G06Q 20/40155 |
| 11,699,145 | B1 | 7/2023 | Yang et al. | |
| 11,797,990 | B2* | 10/2023 | Rodriguez | H04W 8/005 |
| 2004/0122771 | A1* | 6/2004 | Celi, Jr. | G06Q 20/3223 |
| | | | | 705/43 |
| 2006/0068817 | A1* | 3/2006 | Black | G07F 19/201 |
| | | | | 455/466 |
| 2011/0238573 | A1* | 9/2011 | Varadarajan | G06Q 20/3263 |
| | | | | 705/43 |
| 2012/0160912 | A1* | 6/2012 | Laracey | G06Q 20/3274 |
| | | | | 235/379 |
| 2012/0197797 | A1* | 8/2012 | Grigg | G06Q 20/1085 |
| | | | | 705/43 |
| 2012/0226610 | A1* | 9/2012 | Gill | G06Q 20/1085 |
| | | | | 235/379 |
| 2013/0154460 | A1 | 6/2013 | Paterson et al. | |
| 2013/0238497 | A1 | 9/2013 | Ramachandran et al. | |
| 2014/0279491 | A1* | 9/2014 | Martin | G07F 19/201 |
| | | | | 705/43 |
| 2016/0240050 | A1* | 8/2016 | Block | G06Q 20/1085 |
| 2017/0124544 | A1* | 5/2017 | Recriwal | G06Q 20/326 |
| 2017/0262823 | A1* | 9/2017 | Hartung | G06Q 20/1085 |
| 2018/0005206 | A1* | 1/2018 | Belin | G06Q 20/1085 |
| 2018/0068297 | A1* | 3/2018 | Goodman | G06Q 40/02 |
| 2018/0165663 | A1 | 6/2018 | Naik et al. | |
| 2018/0300991 | A1 | 10/2018 | Park | |
| 2019/0034915 | A1* | 1/2019 | Van Wiemeersch | G06Q 20/352 |
| 2019/0073663 | A1* | 3/2019 | Jamkhedkar | G06Q 20/325 |
| 2020/0005272 | A1* | 1/2020 | Iqbal | G06Q 20/3224 |
| 2020/0082676 | A1 | 3/2020 | Carroll et al. | |
| 2020/0111072 | A1 | 4/2020 | Ans et al. | |
| 2021/0049583 | A1 | 2/2021 | Wurmfeld et al. | |
| 2021/0133710 | A1* | 5/2021 | Kohli | G07F 19/203 |
| 2021/0142314 | A1* | 5/2021 | Pharr | H04N 5/33 |
| 2021/0150497 | A1* | 5/2021 | Phillips | G06Q 20/3276 |
| 2021/0357906 | A1* | 11/2021 | McGraw, IV | H04L 67/025 |
| 2022/0020000 | A1* | 1/2022 | Wilson | G06Q 20/407 |
| 2022/0058601 | A1 | 2/2022 | Yaqub et al. | |
| 2022/0058906 | A1* | 2/2022 | Dundigalla | G06Q 20/407 |
| 2022/0138746 | A1* | 5/2022 | Rodriguez | G06Q 20/401 |
| | | | | 705/43 |
| 2022/0139176 | A1* | 5/2022 | Weis | G06Q 20/322 |
| | | | | 235/379 |
| 2022/0405725 | A1* | 12/2022 | Grossman | G07F 9/001 |
| 2022/0405757 | A1* | 12/2022 | Hansen | G06Q 30/0267 |
| 2023/0028010 | A1* | 1/2023 | Pathak | G07F 19/2055 |
| 2023/0281595 | A1* | 9/2023 | Ober | G07F 19/211 |
| | | | | 705/21 |

FOREIGN PATENT DOCUMENTS

| | | | | |
|---|---|---|---|---|
| DE | 102019102005 A1 | * | 7/2020 | ........... G06Q 20/322 |
| EP | 2450858 A1 | * | 5/2012 | ............. G06Q 20/32 |
| IN | 201001298 I4 | * | 6/2012 | |
| IN | 202111035616 A | * | 3/2023 | |
| PH | 12009000141 B1 | * | 1/2011 | |
| SG | 10202107933Y A | * | 9/2021 | |
| TR | 201922647 A2 | * | 4/2020 | |
| WO | WO-2017155530 A1 | * | 9/2017 | ........... G06Q 20/108 |

OTHER PUBLICATIONS

Phothikitti, K., 2020. Factors influencing intentions to use cardless automatic teller machine (ATM). (Year: 2020).*

* cited by examiner

BANKING AT AN ATM USING A MOBILE DEVICE

FIELD OF THE DISCLOSURE

Aspects of the disclosure relate to using a mobile device to engage in banking functions on an automated teller machine (ATM) or a point-of-sale device (POS).

BACKGROUND OF THE DISCLOSURE

A user usually initiates a transaction at an ATM or POS using an electronic card, such as a bank card, debit card, or credit card. (Unless otherwise noted, the term ATM is used herein to also refer to a POS). The user is then prompted for a personal identification number (PIN) at the ATM. Upon the detection of a correct PIN number entry at the ATM, the ATM or POS may provide the user with access to banking services that may be performed at the ATM. Menus of available banking services are displayed on a screen at the ATM and the user selects desired options from the menus. Available banking services at an ATM may include withdrawals, transfers, balance inquiries, and may include deposits, to name a few. Available banking functions at a POS may include point of service electronic funds transfers. Data is input to the ATM by a user using one or more input devices, such as with a keypad, buttons adjacent the screen, or directly on a touchscreen.

In using an ATM in a conventional manner, some users may be wary that other people near the ATM may be able to see the screen on the ATM while they are engaged in transactions. Some users may forget to bring the card needed to use the ATM.

It is an object of this invention to make interactions with an ATM more secure and convenient.

SUMMARY OF THE DISCLOSURE

Methods, an apparatus, and a mobile app may be provided to enable a banking transaction to be conducted at an ATM using a mobile device.

In embodiments, the ATM and the mobile device may be configured to communicate via short range wireless communication, such as one or more of near-field communication (NFC), Zigbee, Wi-Fi, Bluetooth, or Ultra-Wideband technologies. In embodiments, the ATM and the mobile device may be configured to communicate using a mobile communications network.

The method may include automatically detecting, by the ATM, a presence of the mobile device of a user in a vicinity of the ATM. The presence may be detected using short range wireless communication. After automatically detecting the presence of the mobile device using short range wireless communication, the presence of the mobile device may be verified. In embodiments, the presence may be verified using a Global Positioning System (GPS) location obtained from the mobile device. The detection or verification of the mobile device may trigger a pushing, to the mobile device, of a mobile application to access banking services on the ATM using the mobile device.

In embodiments, a mobile device may request to initiate a banking transaction with the ATM without an automatic detection of a mobile device by the ATM. For example, a user may initiate the banking transaction with the ATM using the mobile device before the mobile device may be automatically detected.

The method may include transmitting, by the ATM, a signal to the mobile device to prompt the user to select an option on the mobile device to access banking services offered at the ATM using the mobile device. In some embodiments, the signal that is transmitted may include a message that includes a link for the mobile device to access a mobile application. The mobile application may provide an interface for the entry of user identification information and for access to the services offered at the ATM. In some embodiments, the transmission of the signal from the ATM to the mobile device may trigger the launch (opening) of a mobile application on the mobile device.

In some embodiments, the mobile application may include a menu that replicates the menu that is available on the ATM. In some embodiments, the mobile application may be different from the menu that is available on the ATM.

The method may further include verifying that the user has permission to access the banking services offered at the ATM based on user identification information entered at and submitted via the mobile device. In embodiments, the verification may include multi-factor authentication using two or more credentials. After verification of the user identification information, the user may be enabled to access one or more of the banking services at the ATM using the mobile device and to view account-related information on the mobile device. The method may include disabling selectability of banking service options using a screen of the ATM while the mobile device is enabled to allow user access to the banking services using the mobile device.

In some embodiments, the screen on the ATM may remain inactive while the selection of banking options at the ATM is disabled. In some embodiments, the screen on the ATM may display a non-account related message while the mobile device is enabled for the user to access the banking services using the mobile device.

In embodiments, when the user is banking using the mobile device, the method may enable the user to elect to make a deposit or a withdrawal at the ATM via a user selection on the mobile device. In embodiments, the ATM may accept the deposit or dispense the withdrawal elected by the user using the mobile device.

One or more images or video may be obtained with a camera on the mobile device to monitor security near the mobile device.

A method may also be provided for using a mobile device to conduct a banking transaction via an ATM using a mobile device. The method may provide a mobile device having a short-range wireless communication capability such that the mobile device is automatically detectable by an ATM in a vicinity of the ATM. The mobile device may engage in a short range wireless communication with the ATM upon detection of the mobile device by the ATM. The mobile device may be configured to permit entry, at the mobile device, of user identification information to access banking services provided at the ATM. After verification, the mobile device may verify, via the ATM, that the user has permission to access the banking services offered at the ATM based on the user identification information. The mobile device may enable access to one or more of the banking services at the ATM using the mobile device instead of engaging in banking transactions using an input device on the ATM. The screen of the ATM may be inactive while the mobile device is enabled for the user to access the banking services using the mobile device.

The method may include accessing of the one or more banking services at the ATM using a mobile application on the mobile device.

The method may include submitting, using the mobile device, a request for a deposit to be performed at the ATM, thereby causing the ATM to accept the deposit at the ATM. The method may include submitting, using the mobile device, a request for the ATM to dispense a withdrawal at the ATM, thereby causing the ATM to dispense the withdrawal at the ATM.

A method may also be provided for enabling a banking transaction to be conducted at an automated teller machine (ATM) using a mobile device for user interaction with the ATM. The method may provide access, by the ATM to a mobile device in a vicinity of an ATM, to enable a user to select an option to access banking services offered at the ATM using a mobile device The method may verify that the user has permission to access the banking services offered at the ATM based on user identification information submitted via the mobile device. After verification of the user identification information, the method may enable the user to access the banking services at the ATM using the mobile device and to view information related to the banking services on the mobile device. The method may include disabling selectability of banking service options using a screen of the ATM while the mobile device is enabled to allow user access to the banking services using the mobile device.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

The present disclosure relates to methods of interacting with an ATM using a mobile device for data input and display. The ATM may be used to obtain or submit items or objects. For example, the ATM may be used to obtain a cash withdrawal, to obtain a printed receipt or to deposit checks or cash.

Illustrative embodiments of methods and apparatus in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of methods and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

Methods and apparatus described herein are illustrative. Methods and apparatus of the invention may involve some or all of the steps of the illustrative methods and/or some or all of the features of the illustrative apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

Figure 1:
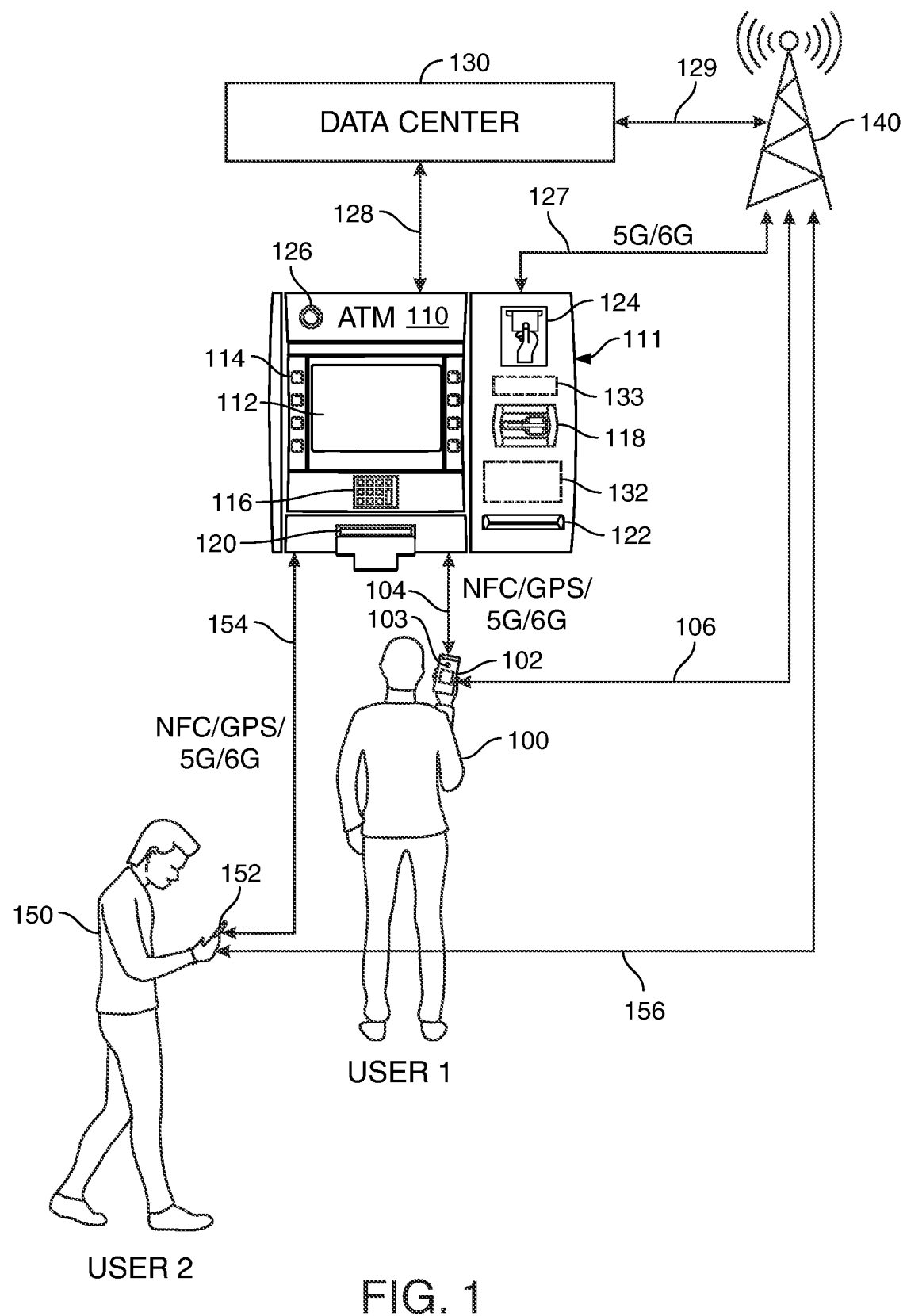
FIG. 1 shows an illustrative manner of using one or more mobile devices to interact with an ATM in accordance with principles of the disclosure.

FIG. 1 shows an illustrative environment in which users may interact with an ATM 110 using a mobile device in accordance with the present disclosure. ATM 110 may be provided by a bank or a non-bank operator (e.g., an ATM installed at a store). ATM 110 may be configured by hardware, software, or a combination thereof, to provide a variety of services. Some ATMs may provide a fuller set of services including cash withdrawals, cash or check deposits, electronic transfers, check balances, electronic payments, or other banking functions. Some ATMs may provide a subset of these services or other services.

ATM 110 may be standalone, located in a kiosk 111, may be mounted in a wall, or otherwise made available to users. Components or circuitry coupled to ATM 110, such as any components or circuitry mounted in or near ATM kiosk 111 or otherwise connected or linked to ATM 110, may also be considered part of ATM 110 for purposes of this disclosure.

ATMs may have different configurations for direct user interactions. In some embodiments, screen 112 may be a touchscreen that allows a user to select a function from a menu of functions and enter other information such as amounts to withdraw or an amount of a deposit directly on the screen. In some embodiments, screen 112 may be a display without touchscreen functionality. When screen 112 is not a touchscreen, a menu may be shown on screen 112 and selections from the menu may be performed using one or more buttons 114 provided on the sides of screen 112. A numeric or alphanumeric keypad 116 may be provided for data entry such as to entry a personal identification number (PIN) to gain user access to the ATM or to enter an amount of money to withdraw, deposit, transfer or pay.

ATM 110 may also include one or more of a card reader 118 to read a user card that is used to access the ATM, such as a bank card, debit card, or credit card, a tray 120 to dispense cash, a slot 122 to insert cash or checks, a receipt dispenser 124 to dispense receipts for transactions performed at the ATM, and a security camera 126 to monitor an area surrounding the ATM.

ATM 110 may include a transceiver 132 and/or router 133 that is configured for communicating with mobile devices. In embodiments, transceiver 132 and/or router 133 may communicate via one or more short range wireless communications technologies. For example, transceiver 132/router 133 may be compatible with one or more of near-field communication (NFC), Wi-Fi, Zigbee, Bluetooth, or Ultra-Wideband (UWB) technologies. Transceiver 132/router 133 may operate as a detector for detecting a presence of a mobile device in the vicinity of ATM. ATM 110 may be configured for communication with a mobile communications network.

ATM 110 may also be configured to communicate with a data center 130. Data center 130 may include one or more central servers. Communications between ATM 110 and data center 130 may be configured to be conducted via link 128, which may represent one or more wired connections. Communications between ATM 110 and data center 130 may be performed via a wireless communication network 140, such as via a 5G network, a wireless link or links 127 and 129. Communications may also be conducted via a combination of wired and wireless communications.

Data center 130 may be maintained as a private network or may be cloud-based. Data center 130 may provide access to and store data, including financial data. The data may allow ATM 110 to verify a user's identity, to provide financial information needed by the ATM such as customer account information and balances available, and to collect information relating to new transactions performed at ATM 110.

Mobile device 102 may be one of a smartphone, a laptop, tablet, iPad, a smart car, a smart card, or any other computing device that is able to communicate with ATM 110 using one or more wireless communication technologies. The wireless communication technology that is used for mobile—ATM communications may include a short range wireless communication technology. Mobile device 102 may have a display and may have one or more ports to connect external devices. The display on mobile device 102 may be a touchscreen, in which case user input may be via the screen. Mobile device 102 may have or be connected to a keypad (not shown) for user input. Mobile device 102 may also have or be connected to one or more cameras, such as camera 103, on the front or back of mobile device 102. Mobile device 102 may communicate with ATM 110, for example, over link 104 such as with a short range wireless communication or via a link 106 over a mobile communications network 140, such as a 5G or 6G network.

Mobile device 102 may have a memory that is configured to have one or more applications ("mobile applications" or "apps") saved thereon. One of the applications that may installed on the mobile device 102 may be an application to access services available at ATM 110.

As shown in FIG. 1, a first user 100, user 1, in the vicinity of ATM 110 may engage with ATM 110 directly at ATM 110. User 100 may wish to avoid direct use of ATM 110 and may prefer to instead access ATM 110 with mobile device 102.

User 100 may initiate contact with ATM 110 using mobile device 102 even before user 100 is in proximity to the ATM 110 such that mobile device 102 may be detected by ATM 110. User 100 may already have the relevant application loaded on mobile device 102 or may have to download the application to the mobile device 102 to initiate contact.

In embodiments, user 100 need not initiate contact as ATM 110 may be configured to automatically detect the presence of mobile device 102 when mobile device 102 comes into proximity to ATM 110. The specific distance of mobile device 102 to ATM 110 that may trigger the detection of mobile device 102 may vary. For example, the distance may be based on a particular short-range wireless communication technology that may be used. For example, mobile device 102 detection may be detected within a range of 3 or fewer feet from ATM 110 using one type of technology or may have a longer range with a different technology.

ATM 110 may perform a check to confirm the presence of mobile device 102 at the expected location near ATM 110. The additional check may be performed by transmitting a signal to mobile device 102 to allow ATM 110 to verify the expected location using a Global Positioning System (GPS) information from mobile device 102, and to compare the verified location of mobile device 102 to the location of ATM 110. Any detected anomaly between the GPS location information and the expected location may be noted and may cause the transaction to be terminated or re-confirmed. This may help to prevent fraud or to account for a system malfunction. Confirmation of user information may be performed in conjunction with data center 130.

Another manner of confirming the presence of mobile device 102 at the expected location is to display a code on screen 112 of ATM 110. The code may be a numeric or alphanumeric code or a machine-readable code such as a barcode, a QR (quick response) code, or a matrix code. A user may enter a number/alphanumeric code on mobile device 102 or may scan a machine-readable code displayed on screen 112 using mobile device 102.

ATM 110 may transmit a signal to mobile device 102 to prompt user 100 to select an option to access services offered at the ATM using mobile device 102. The signal may be transmitted in one or more formats, such as via a notification sent to mobile device 102. In embodiments, the notification may be sent, for example, using a short range wireless technology, such as NFC, to alert user 100 of a banking option using mobile device 102. The notification may also push a link to the mobile application to mobile device 102. User 100 may use the link to download and install the mobile application if the user does not already have the application installed on mobile device 102.

If user 100 chooses to access services offered at ATM 110 on mobile device 102, user may login to ATM 110 using the mobile application. To login, ATM 110 may request that user identification information be entered on mobile device 102 to verify the user's identity and ensure that the user has permission to access the services offered at ATM 110. The user identification information that is required by ATM 110 for verification may vary. Verification may require entry on mobile device 102 of a user ID and a PIN number or other password. For more secure access, multi-factor authentication may be used. For example, in some embodiments, in addition to a user login, a security code may be sent to mobile device 102 and the security code must be entered correctly to confirm user identification. In some embodiments, a security/challenge question must be answered. In some embodiments, entry of biometric data on mobile device 102 may be required. Examples of biometric data that may be used include a fingerprint, a picture of the user's face for performing face recognition, or a voice print, to name a few. Verification by ATM 110 may be performed with reference to user information that is stored at data center 130. Upon successful verification, a banking session may begin.

User 100 may perform transactions via ATM 110 using mobile device 102. ATM 110 may confirm transactions (e.g., account balances or money available for withdrawal) by communicating with data center 130 where the information is maintained and updated. ATM 110 may be used to dispense cash for withdrawals and to deposit cash or checks where ATM 110 has those capabilities. ATM 110 may also be used to dispense a paper receipt at the close of the banking session.

FIG. 1 also shows that a second user 150, User 2, may be waiting to use ATM 110 for a future banking transaction using mobile device 152 of user 150 while user 100 is conducting a transaction using mobile device 102. Mobile device 152 may communicate with ATM 110, for example, over link 154 such as with a short range wireless communication (e.g., NFC) or via link 156 over a mobile communications network 140, such as a 5G or 6G network. Mobile device 152 may obtain and install the mobile application to interact with ATM 110 via the Internet while waiting for user 100 to complete the banking session of user 100. In some embodiments, if the range of wireless communications from ATM 110 is sufficient to reach mobile device 152 while user 102 is interacting with ATM 110, ATM 110 may push a notification to mobile device 152. The notification may provide access to or activate the mobile application on mobile device 152 to prepare for a banking session between ATM 110 and mobile device 152 after the current session with mobile device 102 is completed. User 150 may just wait to obtain the mobile application to be pushed from ATM 110 after the current session is completed.

As another option, while waiting to access ATM 110, user 150 may use the mobile application to log in to a web site to initiate communication with ATM 110. When user 100 is finished with the session on ATM 110, mobile device 152 may transfer online communication to communicate directly with ATM 110 such as to perform withdrawals, deposits, or obtain a printed receipt.

The use of mobile device 102 also enables one or more cameras 103 on mobile device 102 to monitor the surroundings while user 100 is using ATM 110. The video may be provided as a live feed from mobile device 102 to a security monitoring system that may be implemented at ATM 110 and may be used to capture images or video to supplement video captured by camera 126 at ATM 110.

Figure 2:
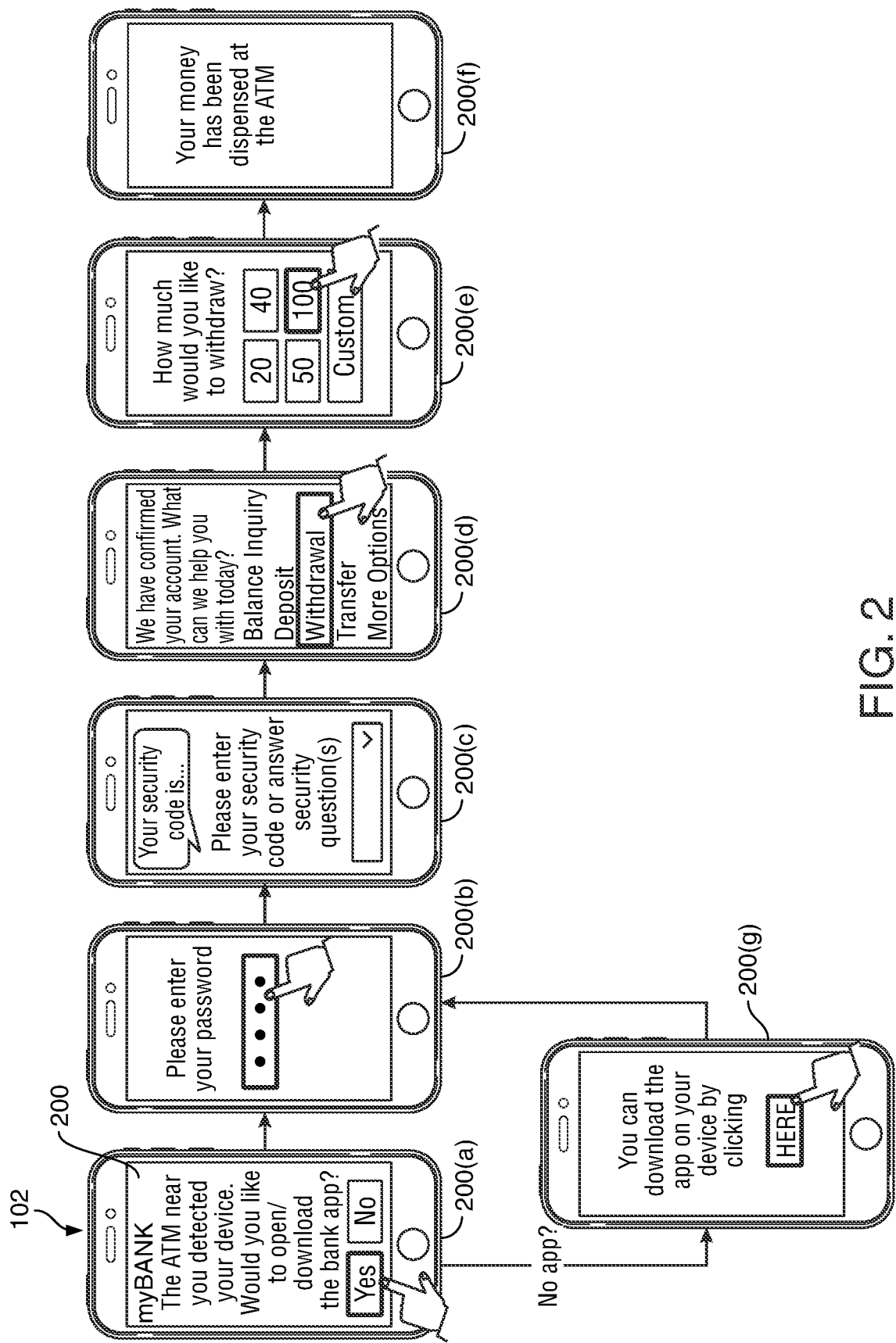
FIG. 2 shows an illustrative series of screens that may appear on a mobile device while interacting with the ATM in accordance with principles of the disclosure.

FIG. 2 shows an example of illustrative screens that may be displayed on a screen 200 of mobile device 102 during interactions between ATM 110 and mobile device 102.

Screen 200(*a*) shows an illustrative screen when ATM 110 detects mobile device 102 where user 100 is interacting with an ATM of a bank. The screen may offer the option to open or download the mobile application. Upon selection of open/download, if the application is not already installed on mobile device 102, screen 200(*g*) may be displayed to offer an option of downloading the application.

The mobile application may be launched on mobile device 102 and may be displayed on the entirety of the screen or just on a portion of the screen.

Screen 200(*b*) shows an example of one of the screens that may be used in entering user identification information for user verification purposes during login. This may be followed by another screen, such as screen 200(*c*), that requests a verification code or an answer to one or more security/challenge questions for multi-factor authentication.

Once the user is granted access to ATM 110, a screen may appear on mobile device 102 showing a menu of available banking services (transactions) that may be performed using mobile device 102 via ATM 110. The menu that appears may replicate the menu screen that, in the absence of a login with mobile device 102, would be accessed on ATM 110. The menu could also look different from an ATM menu screen. An illustrative screen is shown in screen 200(*d*). The desired service may then be selected. If not all services may be displayed on a single screen, the screen may offer a user an option to select "More Options" to see additional service options. In the example illustrated in screen 200(*d*), a user chooses to perform a withdrawal via ATM 110. Screen 200(*e*) may then present a screen to choose an amount to withdraw. Screen 200(*f*) may then indicate that money has been dispensed at ATM 110.

While a transaction is being performed using mobile device 102, the screen on ATM 110 may become inactive for performing transactions.

Figure 3:
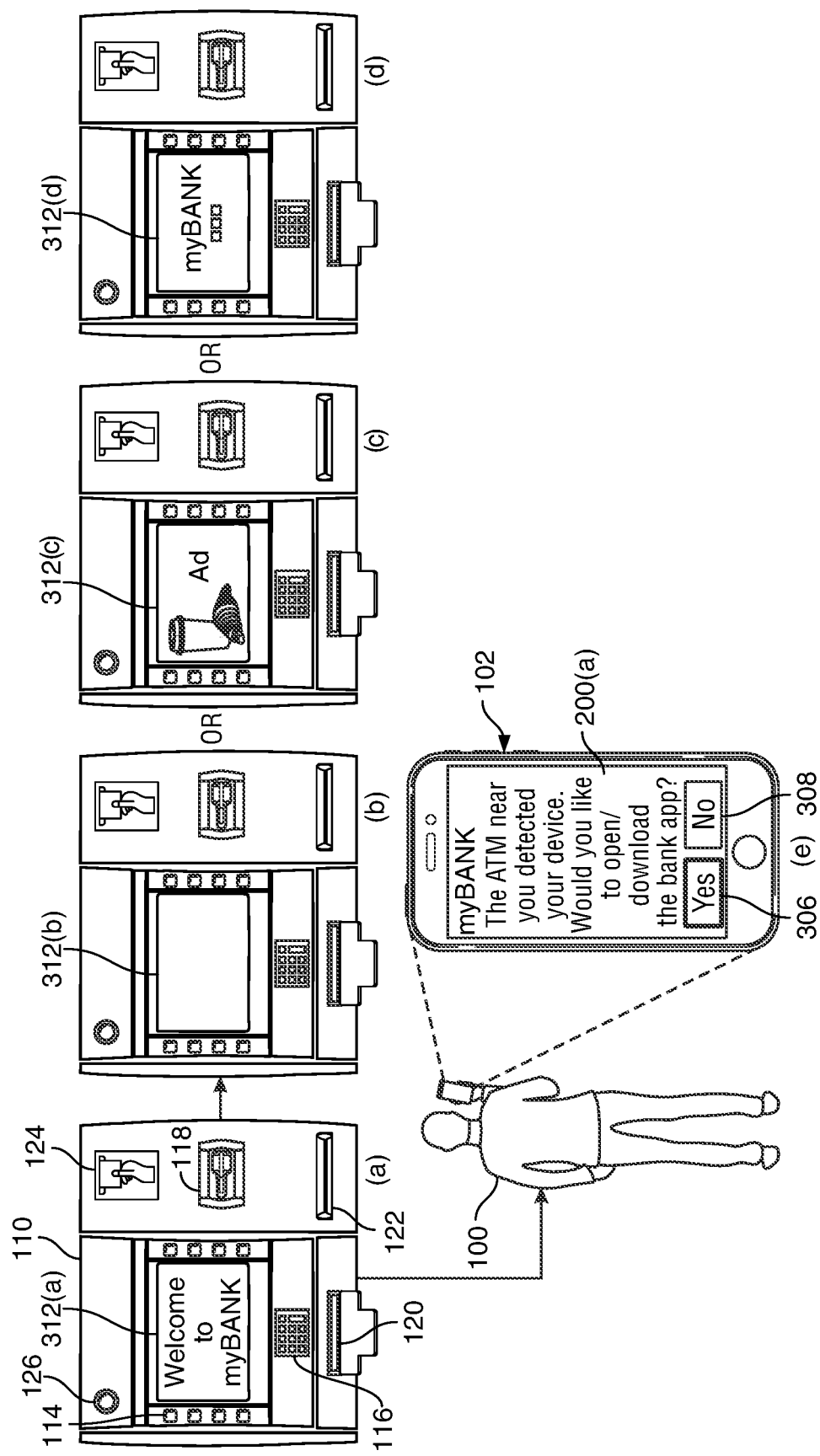
FIG. 3 shows an illustrative series of images that may appear on an ATM screen while the mobile device is interacting with the ATM in accordance with principles of the disclosure.

FIG. 3 shows illustrative images that may appear on an ATM screen. Initially, before a mobile device 102 comes into the vicinity of ATM 110, screen 112 may show a welcome message 312(*a*) as shown in FIG. 3(*a*). When mobile device 102 comes with a communications range of ATM 110, a push notification may show on mobile device 102 as shown in FIG. 3(*e*), asking whether user 100 would like to open or download the banking mobile application. A user 100 may respond "No" at 308, when uninterested. However, if user 100 responds "yes" (at 306) and opens the mobile application, the screen on ATM 110 may become inactive, meaning that it is not actively used for performing ATM transactions. When screen 112 is inactive, it may be used in various ways. For example, screen 112 may become blank, such as shown as sample screen 312(*b*) in FIG. 3(*b*). Screen 112 may continue to display a welcome message as in FIG. 3(*a*) or may display a message such as "ATM is in use" (not shown). Screen 112 may display a non-account related message such as an advertisement including an image or video as shown in FIG. 3(*c*). Screen 112 may show a bank logo or a marketing message as shown in FIG. 3(*d*). Thus, screen 112 on ATM 110 may go blank or be used for other purposes when it is inactive. Screen 112 may return to active status when a user logs off from the mobile application.

Figure 4:
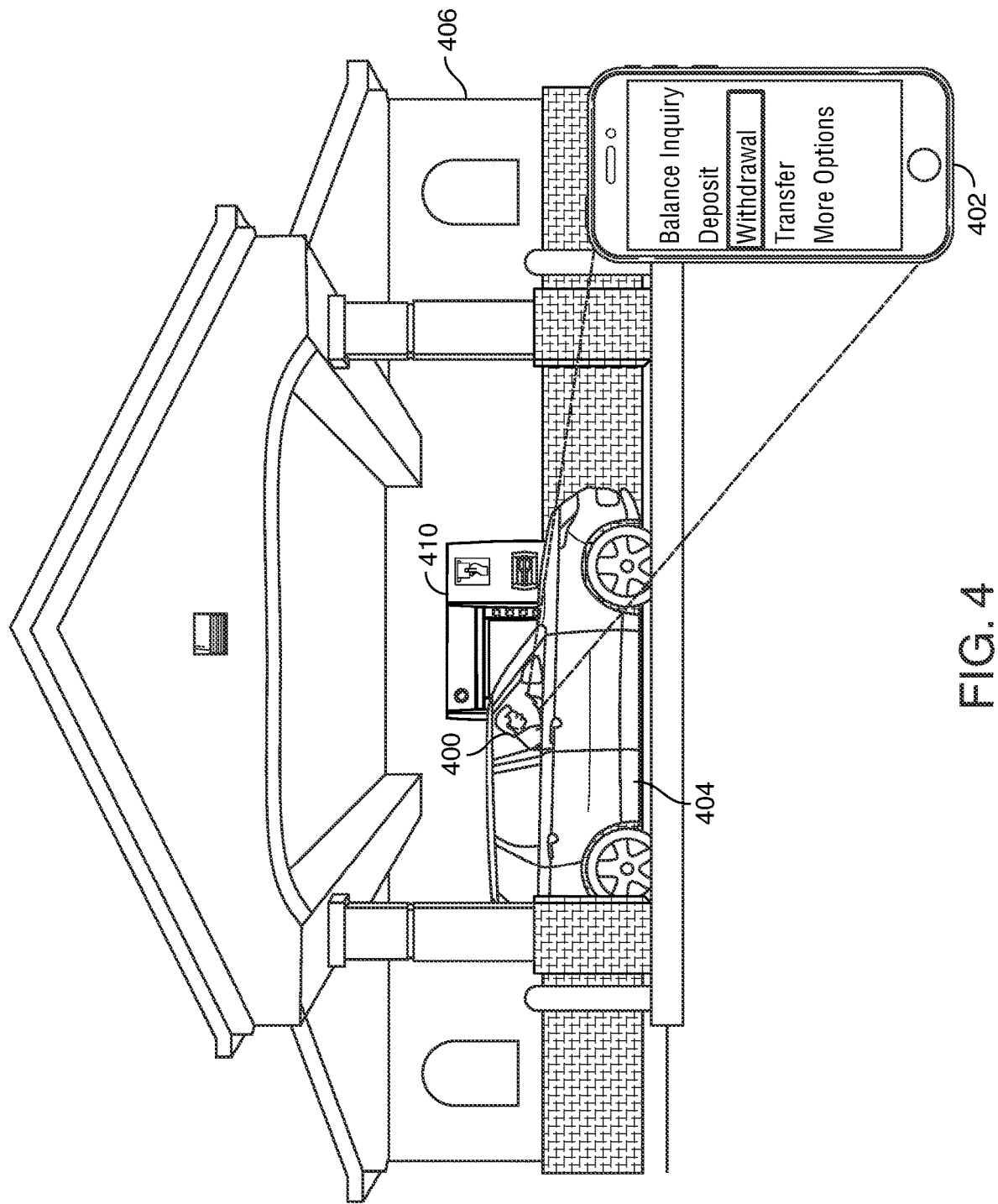
FIG. 4 shows an illustrative interaction between a mobile device used by an occupant in a vehicle and an ATM at a drive-thru ATM in accordance with principles of the invention.

FIG. 4 shows another setting in which a mobile device may interact with an ATM in accordance with principles of the present disclosure. In FIG. 4, a user 400 in a car 404 may interact with an ATM 410 mounted in a building 406 on a side of a drive-thru lane. Mobile device may be positioned within the car, such as a laptop, iPad, tablet, a smartphone, or any other computing device.

User 400 may use a mobile device 402 to perform a transaction while situated in the user's car 404 in a drive-thru lane of adjacent building 406. Transactions may be performed using a mobile device as described above while the insertion of deposits, cash withdrawals, or obtaining of paper receipts may be performed at ATM 410.

Figure 5:
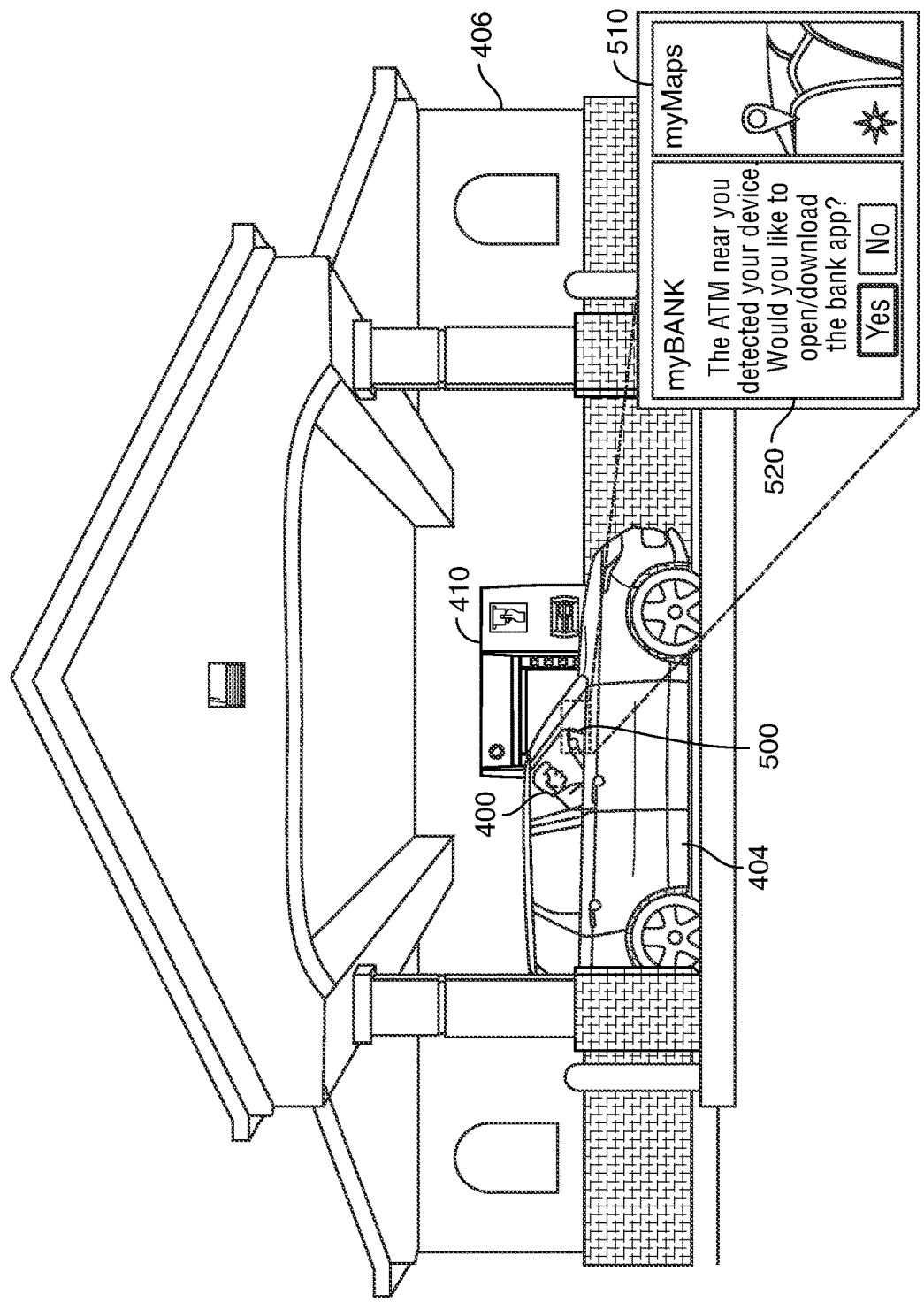
FIG. 5 shows an illustrative interaction between a vehicle-installed mobile device used by an occupant in a vehicle and an ATM at a drive-thru ATM in accordance with principles of the invention.

FIG. 5 shows a similar drive-thru scenario as shown in FIG. 4 but the mobile device 500 may be a computing system run on a smart car. Computing system may be a vehicle-installed system that may include, for example, a screen mounted to a dashboard, a car roof, or back of a seat, that supports short range communication or wireless communication, such as (NFC), Wi-Fi, Zigbee, Bluetooth, or Ultra-Wideband (UWB) technologies and that is enabled to support an app that interacts with an ATM. Mobile application may be loaded on mobile device 500. As shown in this example, when the mobile application is opened on screen 500, mobile application may appear on a portion 520 of screen 500, rather than on an entirety of screen 500. This allows room for display of other information on screen 500 such as GPS information 510.

Figure 6:
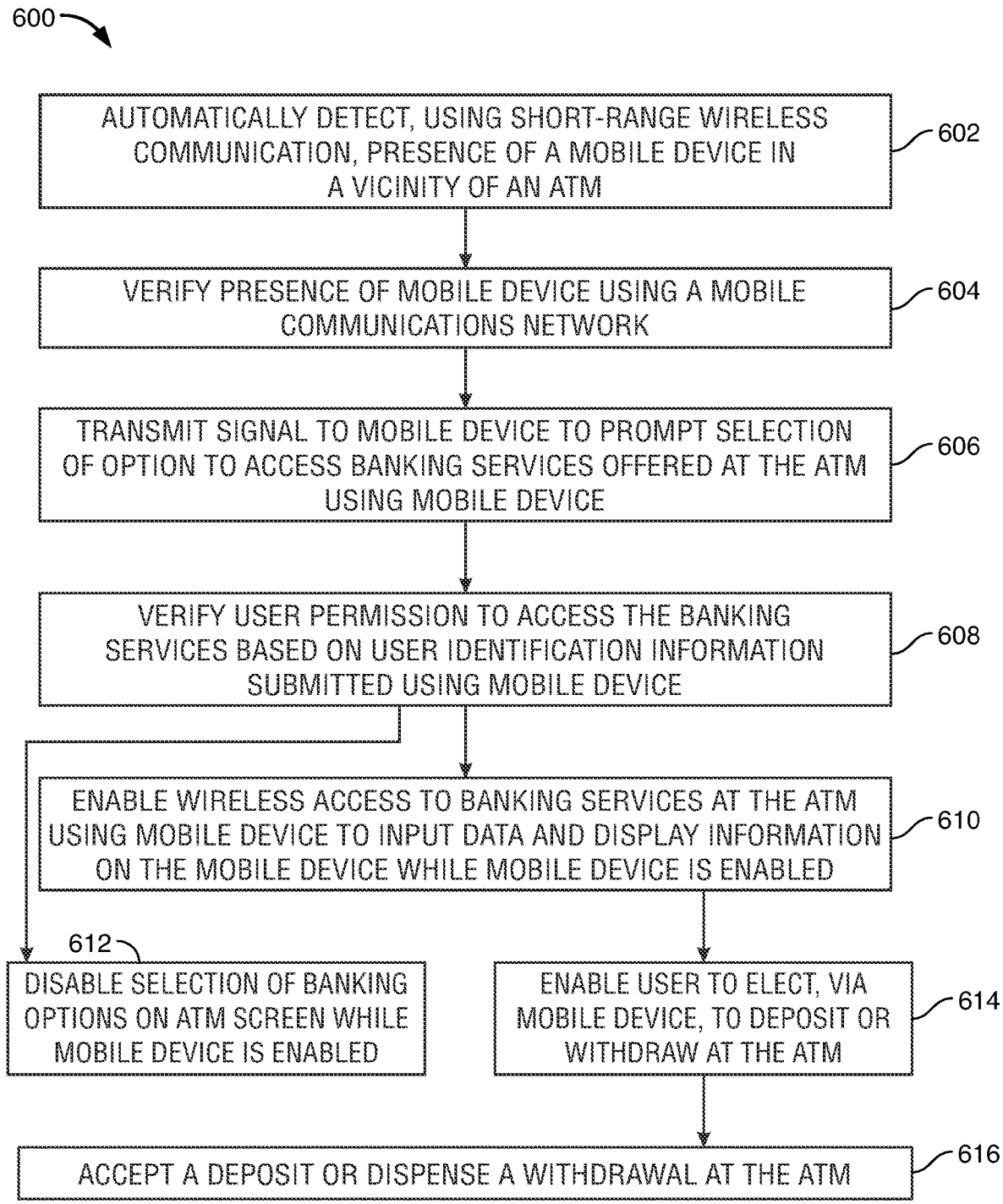
FIG. 6 shows an illustrative flow chart of method steps that may be performed at an ATM in accordance with principles of the invention.

FIG. 6 shows an illustrative flow chart of a method 600 that may be performed at ATM 110 in accordance with principles of the invention.

The method 600 may begin at step 602 when an ATM may automatically detect the presence of a mobile device in a vicinity of the ATM. The detection may be via a short-range wireless communication. Step 602 may be unnecessary where the user of the mobile device initiates communication with the ATM before being detected. At step 604, the presence of a mobile device in the vicinity of the ATM may be verified, such as by using a mobile communications network. At step 608, the ATM may transmit a signal to the mobile device to prompt a user of the mobile device to select an option to access banking services offered at the ATM using the mobile device. At step 608, if a user requests access to banking services offered at the ATM, the ATM may verify the user permission to access the banking services that are requested based on user identification information submitted using the mobile device. At step 610, after verification of the user identification information, the ATM may enable wireless access to banking services at the ATM using the mobile device to input data and display information. At step 612, while banking is enabled at the ATM, selection of banking options may be disabled on the ATM screen. At step 614, the ATM may enable a user to elect to make a deposit or withdrawal at the ATM. At step 616, the ATM may accept a user's request to make a deposit or dispense a withdrawal at the ATM. Multiple transactions may be made during a single banking session. When the transactions are completed, the user logs off and the session ends.

Figure 7:
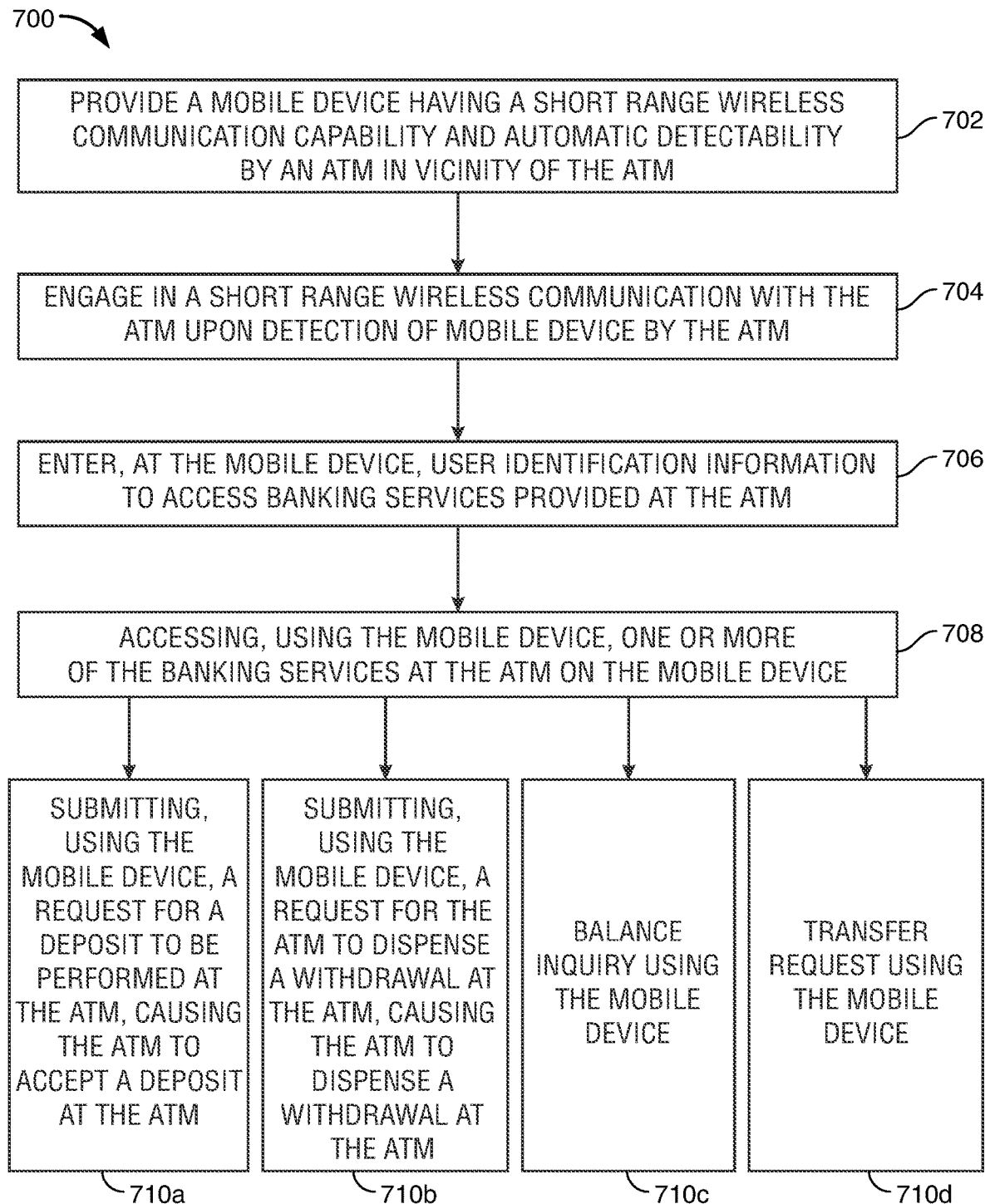
FIG. 7 shows an illustrative flow chart of method steps that may be performed at a mobile device in accordance with principles of the invention.

FIG. 7 shows an illustrative flow chart of a method 700 that may be performed at a mobile device in accordance with principles of the invention. At step 702, a mobile device may be provided. The mobile device may have a short range wireless communication capability and may be automatically detectable by an ATM when the mobile device is in the vicinity of the ATM. At step 704, the mobile device may engage in a short range wireless communication with the ATM upon detection of the mobile device by the ATM. At step 706, a user may enter at the mobile device user identification information to access banking services provided at the ATM. At step 708, if the user identification information is verified by the ATM, the user may access one or more of the banking services at the ATM using the mobile device. At step 710*a*, the user may, for example, submit a request, using the mobile device, to perform a deposit at the ATM. At step 710*b*, the user may, for example, submit a request, using the mobile device, for the ATM to dispense a withdrawal. At step 710*c*, the user may, for example, use the mobile device to request via the ATM a balance inquiry for one or more accounts. At step 710*d*, the user may, for example, use the mobile device to request that a funds transfer be performed via the ATM.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 8:
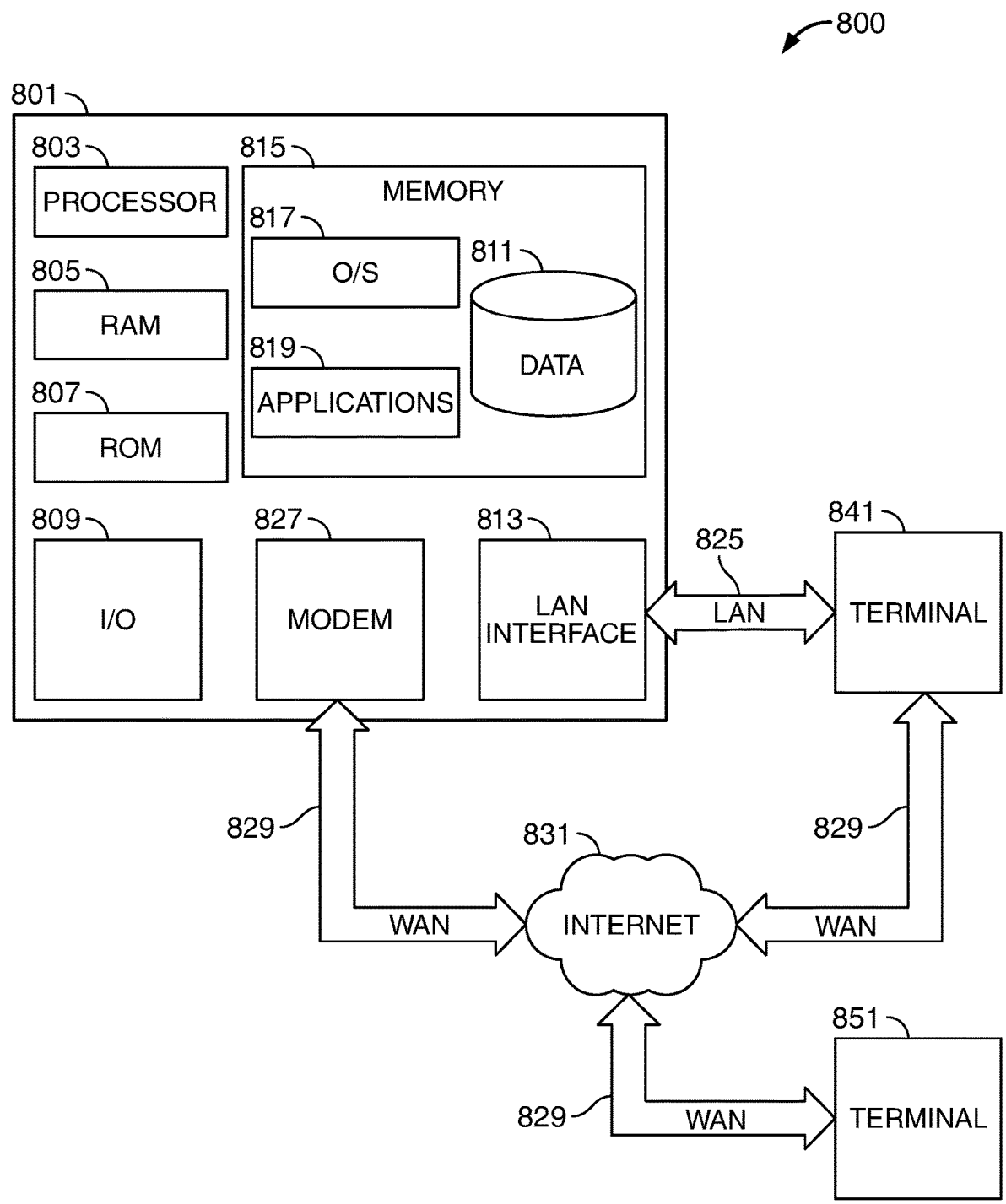
FIG. 8 shows an illustrative system architecture in accordance with principles of the disclosure.

FIG. 8 shows an illustrative block diagram of system 800 that includes computer 801. Computer 801 may alternatively be referred to herein as an "engine," "server" or a "computing device." Computer 801 may be any computing device described herein, such as the computing devices running on the one or more of the ATM, smart phones, smart cars, smart cards and any other mobile device described herein. Elements of system 800, including computer 801, may be used to implement various aspects of the systems and methods disclosed herein.

Computer 801 may have a processor 803 for controlling the operation of the device and its associated components, and may include RAM 805, ROM 807, input/output circuit 809, and a non-transitory or non-volatile memory 815. Machine-readable memory may be configured to store information in machine-readable data structures. Other components commonly used for computers, such as EEPROM or Flash memory or any other suitable components, may also be part of the computer 801.

The memory 815 may be comprised of any suitable permanent storage technology—e.g., a hard drive. The memory 815 may store software including the operating system 817 and application(s) 819 along with any data 811 needed for the operation of computer 801. Memory 815 may also store videos, text, and/or audio assistance files. The data stored in Memory 815 may also be stored in cache memory, or any other suitable memory.

Input/output ("I/O") module 809 may include connectivity to a microphone, keyboard, touch screen, mouse, and/or stylus through which input may be provided into computer 801. The input may include input relating to cursor movement. The input/output module may also include one or more speakers for providing audio output and a video display device for providing textual, audio, audiovisual, and/or graphical output. The input and output may be related to computer application functionality.

Computer 801 may be connected to other systems via a local area network (LAN) interface 813. Computer 801 may operate in a networked environment supporting connections to one or more remote computers, such as terminals 841 and 851. Terminals 841 and 851 may be personal computers or servers that include many or all of the elements described above relative to computer 801.

In some embodiments, computer 801 may be the ATM 110 and Terminals 841 and 851 may be the data center 130, and/or any of mobile devices 102, 152 that may be in electronic communication with ATM 110 via LAN, WAN or any other suitable short-range communication when a network connection may not be established.

When used in a LAN networking environment, computer 801 is connected to LAN 825 through a LAN interface 813 or an adapter. When used in a WAN networking environment, computer 801 may include a modem 827 or other means for establishing communications over WAN 829, such as Internet 831.

In some embodiments, computer 801 may be connected to one or more other systems via a short-range communication network (not shown). In these embodiments, computer 801 may communicate with one or more other terminals 841 and 851, such as the mobile devices including mobile devices 102, 152 described herein etc., using a personal area network (PAN) such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 819, which may be used by computer 801, may include computer executable instructions for invoking functionality related to communication, such as e-mail, Short Message Service (SMS), and voice input and speech recognition applications. Application program(s) 819 (which may be alternatively referred to herein as "plugins," "applications," or "apps") may include computer executable instructions for invoking functionality related to performing various tasks. Application programs 819 may utilize one or more algorithms that process received executable instructions, perform power management routines or other suitable tasks.

Application program(s) 819 may include computer executable instructions (alternatively referred to as "programs"). The computer executable instructions may be embodied in hardware or firmware (not shown). The computer 801 may execute the instructions embodied by the application program(s) 819 to perform various functions.

Application program(s) 819 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 819 may include one or more algorithms that may be used to implement features of the disclosure.

The invention may be described in the context of computer-executable instructions, such as applications 819, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 801 and/or terminals 841 and 851 may also include various other components, such as a battery, speaker, and/or antennas (not shown). Components of computer system 801 may be linked by a system bus, wirelessly or by other suitable interconnections. Components of computer system 801 may be present on one or more circuit boards. In some embodiments, the components may be integrated into a single chip. The chip may be silicon-based.

Terminal 851 and/or terminal 841 may be portable devices such as a laptop, cell phone, Blackberry™, tablet, smartphone, or any other computing system for receiving, storing, transmitting and/or displaying relevant information. Terminal 851 and/or terminal 841 may be one or more user devices. Terminals 851 and 841 may be identical to computer 801 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 9:
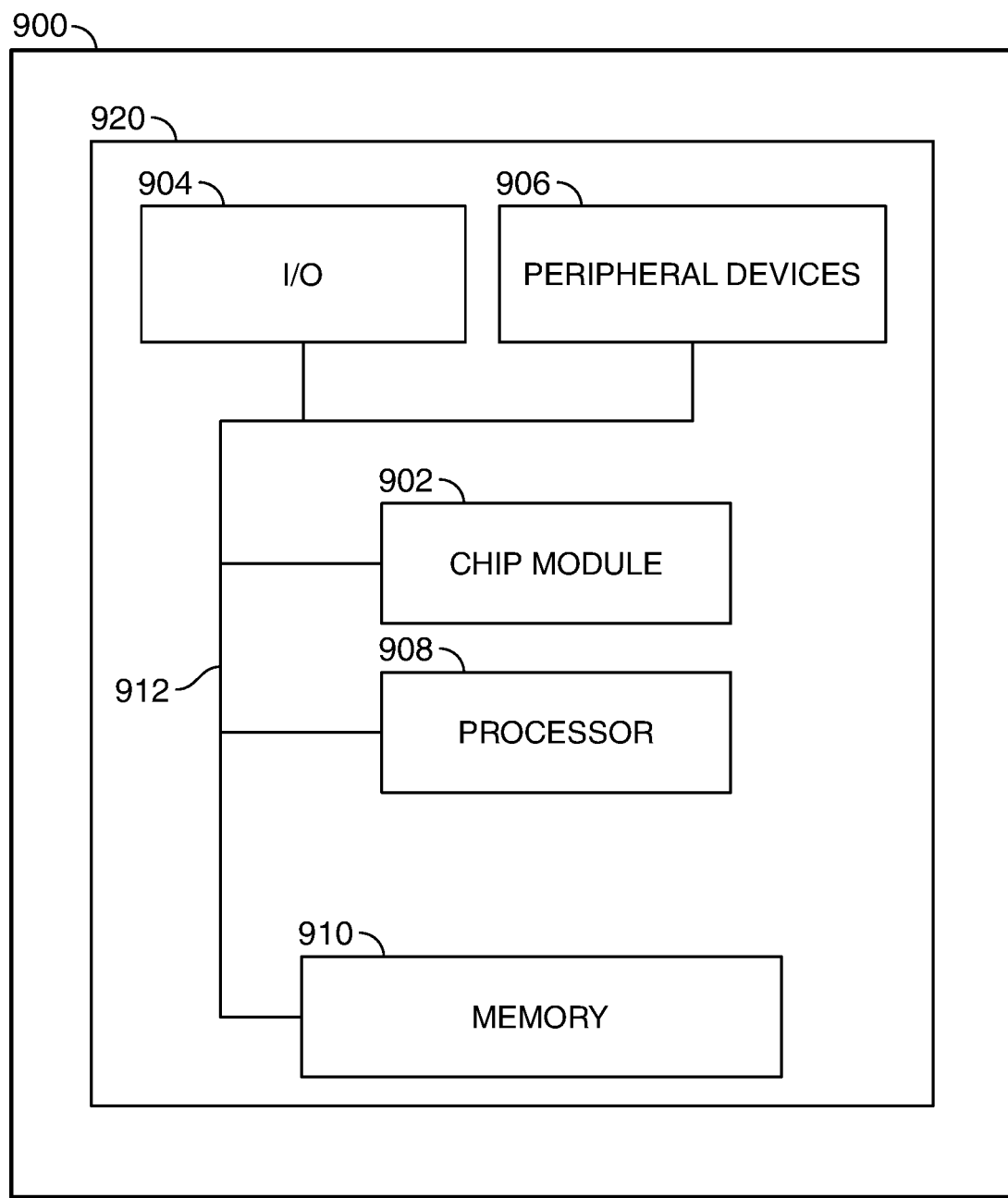
FIG. 9 shows an illustrative architecture of a mobile device in accordance with principles of the disclosure.

FIG. 9 shows illustrative apparatus 900 that may be configured in accordance with the principles of the disclosure. Apparatus 900 may be a computing device. Apparatus 900 may include chip module 902, which may include one or more integrated circuits, and which may include logic configured to perform any other suitable logical operations.

Apparatus 900 may include one or more of the following components: I/O circuitry 904, which may include a transmitter device and a receiver device and may interface with fiber optic cable, coaxial cable, telephone lines, wireless devices, PHY layer hardware, a keypad/display control device or any other suitable media or devices; peripheral devices 906, which may include counter timers, real-time timers, power-on reset generators or any other suitable peripheral devices; logical processing device 908, which may compute data structural information and structural parameters of the data; and machine-readable memory 910.

Machine-readable memory 910 may be configured to store in machine-readable data structures: machine executable instructions, (which may be alternatively referred to herein as "computer instructions" or "computer code"), applications such as applications 819, signals, and/or any other suitable information or data structures.

Components 902, 904, 906, 908 and 910 may be coupled together by a system bus or other interconnections 912 and may be present on one or more circuit boards such as circuit board 920. In some embodiments, the components may be integrated into a single chip. The chip may be silicon-based.

Some of the advantages of using a mobile device to interact with an ATM may be one or more of the following:
  (1) security and privacy—persons other than an ATM user may not be able to see the screen on a mobile device, whereas they may be able to see the screen on an ATM;
  (2) accessibility—easier access to an ATM for some who have difficulty accessing a screen on an ATM;
  (3) versatility—e.g., the same mobile device may be used at different ATMs and certain aspects, such as some login credentials, may be saved for reuse;
  (4) may avoid touching the buttons or screen on the ATM which is a concern to some customers;
  (5) may avoid using card to initiate transaction;
  (6) may reduce complexity of ATM operator updating software on the ATM.

Thus, methods and systems are provided for enabling an automated teller machine ("ATM") to interact with a mobile device to conduct banking services in the vicinity of the ATM using the mobile device. Persons skilled in the art will appreciate that the present invention can be practiced by other than the described embodiments, which are presented for purposes of illustration rather than of limitation.

What is claimed is:

1. A method for enabling banking transactions to be conducted at an automated teller machine (ATM) using a mobile device for user interaction with the ATM, the method comprising:
   automatically detecting, by an ATM processor using short range wireless communication, a presence of a first mobile device of a first user in a vicinity of an ATM,
   transmitting, by the ATM processor using short range wireless communication, a signal to the first mobile device to prompt the first user to select an option to access banking services offered at the ATM using the first mobile device;
   verifying, by the ATM processor, that the first user has permission to access the banking services offered at the ATM based on user identification information submitted via the first mobile device;
   after verification of the user identification information, enabling, by the ATM processor, the first user to access the banking services at the ATM to perform a first banking transaction using short range wireless communication with the first mobile device and to view account-related information on the first mobile device;
   wherein interaction between the ATM and the first mobile device is touchless, and the ATM is configured to be securely accessible with the first mobile device without using an electronic card, separate from the first mobile device, for the first mobile device to initiate wireless communication with or to access the banking services at the ATM;
   while the first mobile device is enabled to allow user access to the banking services using the first mobile device:
      disabling, by the ATM processor, selectability of the banking services using a screen of the ATM;
      presenting on the first mobile device a first menu of banking options that replicates a second menu of banking options that is available on the ATM when the first mobile device is not enabled and providing the user access to the banking services using the first menu on the first mobile device;
      displaying on a screen of the ATM a message that indicates that the ATM is in use; and
      communicating, by the ATM processor using short range wireless communication, with a second mobile device to prepare for the second mobile device to perform a second banking transaction using the ATM after use of the ATM by the first mobile device has concluded.

2. The method of claim 1, further comprising:
   enabling, by the ATM processor, the user to elect, via the mobile device, to perform a deposit or a withdrawal at the ATM while not permitting the user to select the banking transaction at the ATM.

3. The method of claim 2, further comprising:
   accepting, by the ATM processor, the deposit or dispensing the withdrawal at the ATM.

4. The method of claim 1, wherein the detecting, by the ATM processor, of the mobile device using the short range wireless communication is performed via one or more of near-field communication (NFC) or Bluetooth.

5. The method of claim 1, further comprising:
   verifying, by the ATM processor, the presence of the mobile device using a mobile communications network, after automatically detecting the presence of the mobile device of a user in the vicinity of the ATM using the short range wireless communication.

6. The method of claim 1, further comprising verifying, by the ATM processor, the presence of the mobile device in the vicinity of the ATM using a Global Positioning System (GPS).

7. The method of claim 1, wherein the ATM and the mobile device are configured to further communicate via a mobile communications network.

8. The method of claim 1, wherein:
   the step of transmitting, by the ATM processor, the signal to the mobile device comprises transmitting a message that includes a link to access a mobile application that comprises an interface for entry of user identification information and for access to the banking services offered at the ATM.

9. The method of claim 1, wherein:
   the step of transmitting, by the ATM processor, the signal to the mobile device comprises triggering a launch of a mobile application on the mobile device that provides an interface for entry of user identification information and for access to the banking services offered at the ATM.

10. The method of claim 1, wherein the detecting, by the ATM processor, of the mobile device triggers a pushing of a mobile application for installation on the mobile device to access banking services to the mobile device.

11. The method of claim 1, wherein the step of verifying, by the ATM processor at the ATM, that the user has permission to access banking services offered at the ATM comprises multi-factor authentication.

12. The method of claim 1, further comprising:
   receiving, by the ATM processor using short range wireless communication, a request from the mobile device to initiate the banking transaction using the ATM before the presence of the mobile device is detected, and
   performing, by the ATM processor, the banking transaction after the verification of the user identification information, wherein the banking transaction comprises one of:
   a cash withdrawal;
   a deposit of cash or a check;
   an electronic funds transfer;
   a check balance transaction; or
   an electronic payment.

13. The method of claim 1, wherein:
   the screen on the ATM remains inactive while the mobile device is enabled for the user to access the banking services using the mobile device.

14. The method of claim 1, further comprising obtaining, by the ATM processor from the mobile device, one or more images or video with a camera on the mobile device to monitor security near the mobile device.

15. The method of claim 1, wherein the first mobile device is a vehicle-installed computing device, and the step of automatically detecting, by an ATM processor using short range wireless communication, a presence of a first mobile device of a first user in a vicinity of an ATM comprises automatically detecting by the ATM processor the presence of the vehicle-installed computing device in the vicinity of the ATM.

* * * * *